J. M. HUGHES, OF MENOMONEE, WISCONSIN.

Letters Patent No. 85,385, dated December 29, 1868.

IMPROVED MEDICAL COMPOUND.

The Schedule referred to in these Letters Patent and making part of the same.

To all whom it may concern:

Be it known that I, J. M. HUGHES, of Menomonee, in the county of Dunn, and State of Wisconsin, have invented a new and improved Medical Compound; and I do hereby declare that the following is a full, clear, and exact description thereof, which will enable those skilled in the art to make and use the same.

This invention consists in a compound of matter, which, as an external application, is advantageous in treating, among others, the following complaints in cattle: poll-evil, sweeney or swinney, (so called,) horn-distemper, spavin-joint, bruises, swellings, callous; and in mankind the following ailments, among others: chilblains, corns, caked breasts in females, boils, cramps, whitlows, burns, frost-bites, bites of animals, stings of insects, weakness of the joints, scalds, chapped hands, old sores, incised and contused flesh-wounds.

The formula of preparation is as follows:

Good cider-vinegar, one gallon.
Molasses, one-half gallon.
Spirits of turpentine, one pint.
Common salt, one pound.
Saltpetre, one-half pound.
Oil of vitriol, three ounces.
Olive-oil, one ounce.

These ingredients are placed in a suitable vessel, and simmered gently over a slow fire for about two hours, when, on cooling, the compound is ready for use.

I claim as new, and desire to secure by Letters Patent—

The compound of matter composed substantially as herein described.

J. M. HUGHES.

Witnesses:
J. D. CORRILL,
GEO. W. MASON.